Aug. 21, 1956

C. L. HEATER ET AL 2,759,566

WHEEL AND OFF-WHEEL BRAKE

Filed May 17, 1951

INVENTORS.
Charles L. Heater
Carl E. Tack
BY
Atty.

Aug. 21, 1956  C. L. HEATER ET AL  2,759,566
WHEEL AND OFF-WHEEL BRAKE
Filed May 17, 1951  2 Sheets-Sheet 2
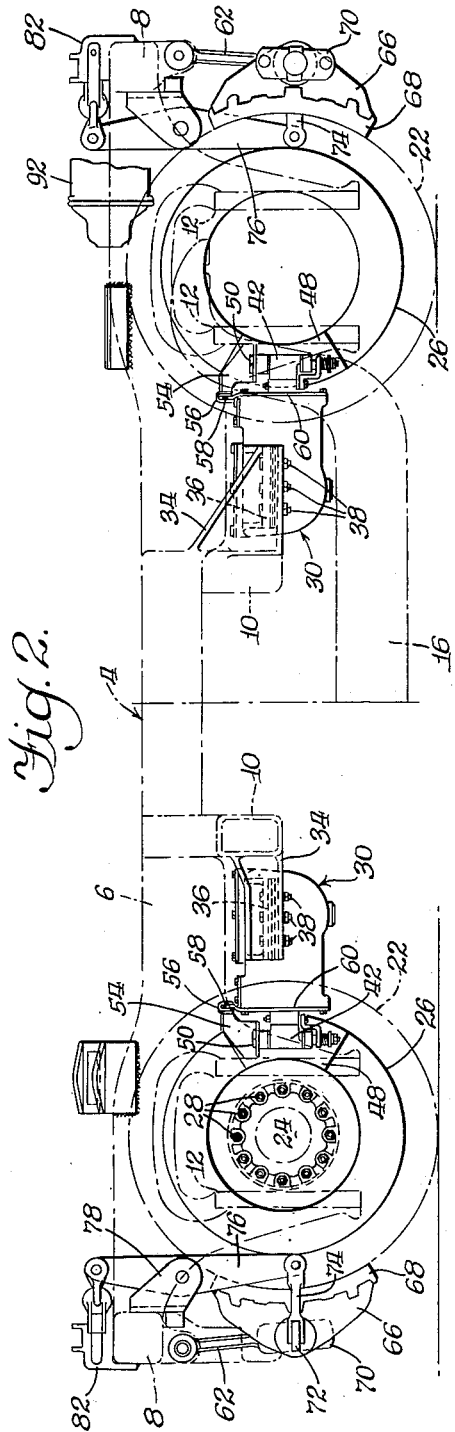
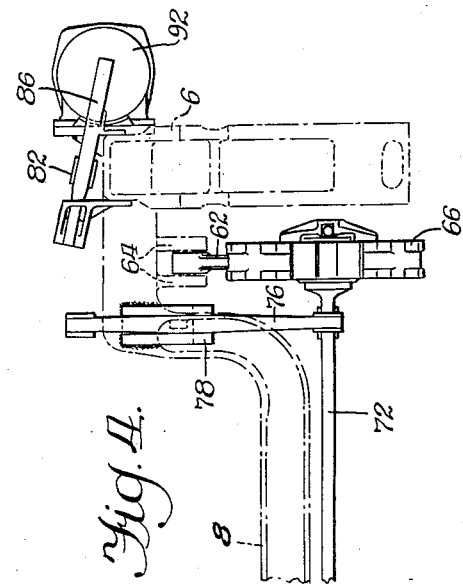
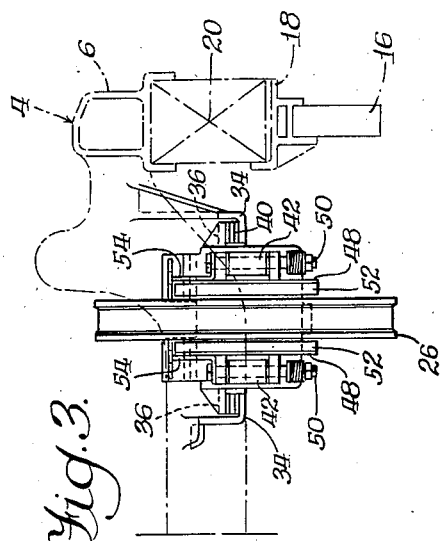
INVENTORS.
Charles L. Heater
Carl E. Tack
BY United States Patent Office 2,759,566
Patented Aug. 21, 1956

2,759,566

WHEEL AND OFF-WHEEL BRAKE

Charles L. Heater, Flossmoor, and Carl E. Tack, Chicago, Ill., assignors to American Steel Foundries, Chicago, Ill., a corporation of New Jersey Application May 17, 1951, Serial No. 226,831

1 Claim. (Cl. 188—33)

This invention relates to a brake arrangement for railway car trucks and is more particularly concerned with the provision of a wheel brake and an off-wheel brake supported on the truck frame to engage and decelerate a wheel and axle assembly.

The present invention contemplates the provision of a brake arrangement for a four-wheel railway car truck of a conventional type comprising a truck frame having side rails, end rails and spaced transoms, a bolster supported between the transoms, a pair of wheel and axle assemblies provided with journal boxes disposed in pedestal openings formed in the ends of the side rails, and a pair of equalizers seated on the journal boxes and provided with the usual spring groups to support the truck frame.

The off-wheel brake arrangement comprises a brake frame supported on each transom and provided with stators to frictionally engage opposite sides of a disk or rotor supported for common rotational movement on the adjacent wheel and axle assembly. As the brake frames project outwardly from remote sides of the transoms to dispose their respective stators in position to engage the portions of the rotors disposed radially inwardly toward their respective brake frames, it is apparent that frictional engagement between the stators and the rotors act to tilt the truck frame from its normal horizontal plane due to the fact that one stator acts to raise the adjacent end of the truck frame while the other stator acts to lower its end of the truck frame. To counteract the forces exerted by the rotors tending to tilt the truck frame, the present invention contemplates the provision of wheel brakes mounted on the truck frame adjacent each end thereof and having brake shoes to engage the portions of the wheel treads remote from the center of the truck frame. Each wheel and axle assembly is thus provided with a brake arrangement in which the stators and brake shoes are arranged on opposite sides of the axis of the assembly to maintain the truck frame in a substantially horizontal plane during application of the brakes.

This invention further contemplates the provision of a brake arrangement in which the off-wheel brake frames are securely mounted on their respective transoms in order to eliminate the use of conventional torque arms heretofore provided to restrain movement of the brake frames relative to the truck frame.

This invention further contemplates the provision of a brake arrangement in which the wheel brakes coact with off-wheel brakes to decelerate a wheel and axle assembly and also serve to effectively clean the peripheral surface of the wheel treads to remove grease or dirt therefrom to insure maximum frictional engagement between the wheels and the tracks when the brakes are applied.

This invention further contemplates the provision of a wheel and off-wheel brake arrangement which is relatively simple and inexpensive in construction and reliable in operation.

This invention embodies other novel features, details of construction and arrangement of parts which are hereafter set forth in the specification and claim and illustrated in the accompanying drawings, wherein:

Figure 2 is a side view of the structure illustrated in Figure 1, the right half of the structure being shown in side elevation and the left half being shown in section taken along the longitudinal vertical plane bisecting the truck.

Figure 3 is a transverse sectional view taken along the line 3—3 of Figure 1, and Figure 4 is a transverse sectional view taken along the line 4—4 of Figure 1.

Figure 1:
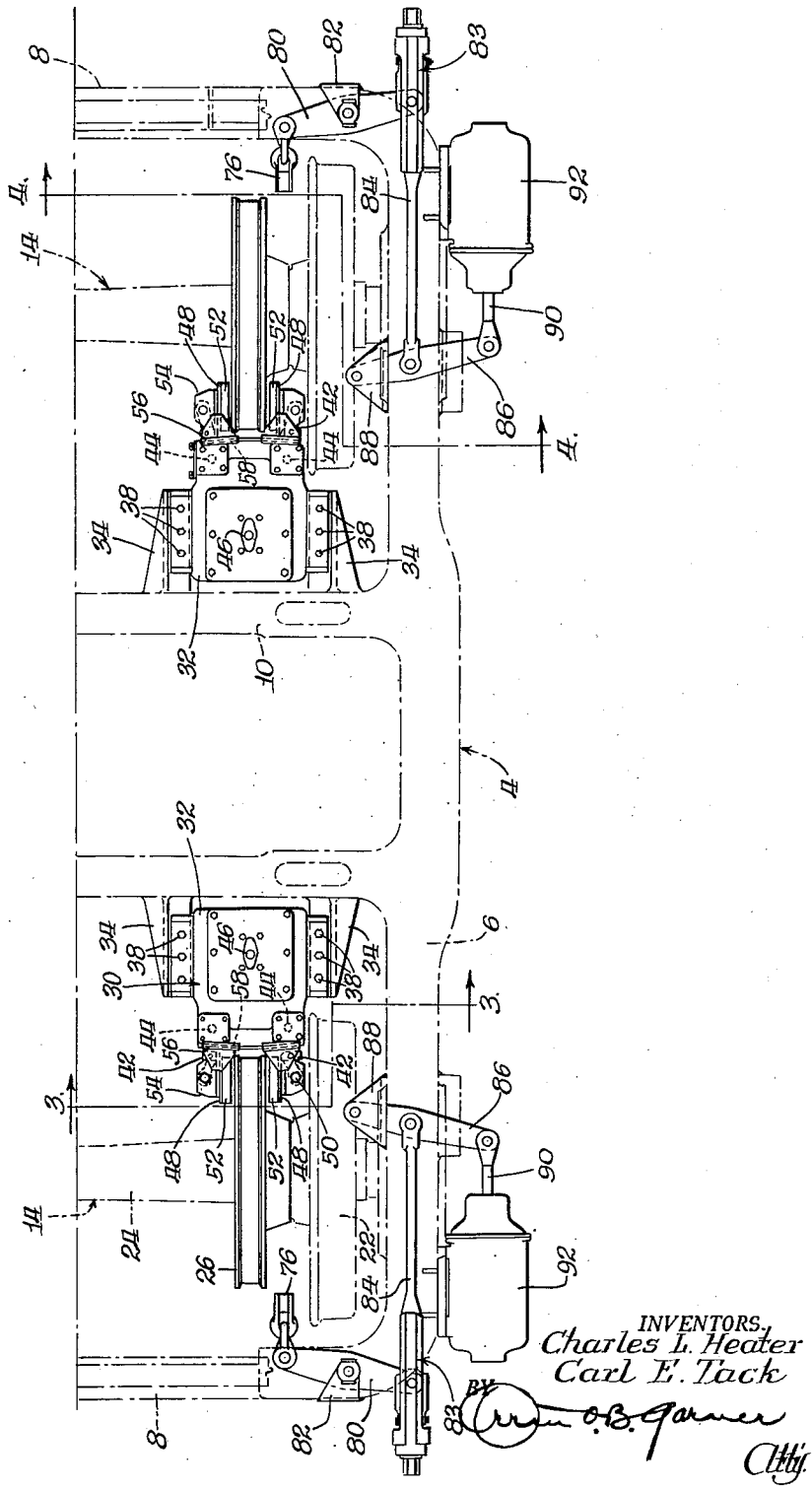
Figure 1 is a top plan view showing one side of a railway car truck embodying features of the present invention, only one-half of the structure being shown as the structure is similar at opposite sides thereof.

Referring now to the drawings for a better understanding of the present invention, the railway car truck is shown as comprising a truck frame 4 embodying side rails 6—6 secured in spaced relation by means of end rails 8—8 and spaced transoms 10—10, the transoms being formed and arranged to support a bolster (not shown) in the conventional manner. The ends of the side rails 6—6 are formed with pedestal jaws 12—12 defining openings to receive journal boxes (not shown) to receive the ends of wheel and axle assemblies 14—14. Equalizers 16—16 are disposed along opposite sides of the truck frame and are seated on their ends upon the journal boxes, each equalizer being provided with spring seats 18 to receive spring groups 20 disposed under and in engagement with the adjacent side rail of the truck frame.

Each wheel and axle assembly is shown as comprising a pair of spaced wheels 22—22 secured to an axle 24. A disk or rotor 26 is secured to each wheel 22 by means of stud and nut assemblies 28. Each off-wheel brake is shown as comprising a brake frame 30 embodying a housing 32 secured along its opposite sides upon a pair of spaced arms 34—34 provided on a transom 10. As illustrated most clearly in Figures 1 and 3 in the drawings, the housing 32 is preferably formed with side flanges 36—36 adapted to be connected to the arms 34—34 by means of bolts 38. To properly position the brake frame 30 with respect to its rotor 26, a plurality of resilient or non-resilient shims 40 are interposed between the arms 34—34 and the side flanges 36—36 of the housing 32.

Each brake frame 30 is provided with a pair of brake levers 42—42 supported for pivotal movement intermediate their ends at 44—44. The inner ends of the brake levers 42—42 are engaged and actuated by a suitable conventional power means (not shown) mounted within the housing 32. The power means is preferably actuated by fluid under pressure leading through a conduit 46. Brake heads 48—48 are pivotally mounted upon the outer ends of brake levers 42—42 by means of pivots pins or bolts 50—50 and are provided with brake shoes 52—52 for frictional engagement against opposite sides of the rotor 26. Each brake head 48 is provided with a guide plate 54 formed with an aperture to receive the pivot bolt 50, the plate being formed with a vertically disposed portion for abutting engagement against the outer side of the brake head. The upper end of each guide plate 54 is formed with an inverted U-shaped portion 56 to slidably receive a tongue 58 formed on the upper end of a cover plate 60 bolted to the front of the housing 32. During pivotal movement of the brake levers 42—42, the guide plates 54—54 and guide tongues 58—58 serve to direct the brake shoes 52—52 into and out of engagement against the sides of the rotor 26. The means thus shown and described for guiding the brake heads toward and away from the sides of the rotor 26 is more particularly shown and described in a copending application, Serial No. 211,515, filed February 17, 1951, in the name William J. Casey, III, now Patent No. 2,690,237.

Each wheel and axle assembly 14 is provided with a tread brake mechanism comprising a pair of brake hangers 62—62 pivotally connected at their upper ends to bosses 64—64 provided on the end rail 8 of the truck frame 4, the lower ends of the brake hangers being pivotally connected heads 66—66 provided with brake shoes 68—68 for engagement with the treads of the wheels 22—22. Each brake head is provided with a balancing means which is indicated generally at 70 and is not more particularly shown and described as the form is no part of the present invention. A brake beam 72 is engaged at its ends to the brake heads 66—66 and is pivotally connected to a pair of connecting links 74—74 which, in turn, are pivotally connected to rocker arms 76—76. The rocker arms 76—76 are supported for pivotal movement intermediate their ends upon brackets 78—78 secured to an end rail 8 of the truck frame. Levers 80—80 are mounted for pivotal movement intermediate their ends upon brackets 82—82 provided on the end rail 8 and are pivotally connected at their inner ends to the upper ends of their respective rocker arms 76. The outer end of each lever 80 is pivotally connected to a slack adjuster indicated generally at 83 and disposed at the end of a pull rod 84 which is pivotally connected at its other end to an intermediate portion of a lever 86. Each lever 86 is pivotally mounted at its inner end upon a bracket 88 secured to the side rails 6—6, the outer end of each lever 86 being pivotally connected to the end of a piston 90 mounted for reciprocative movement within a brake cylinder 92. The brake cylinders 92 are bolted to the side rails 6—6 of the truck frame 4 and are connected to a suitable source of fluid under pressure by means of conduits (not shown).

In the type of railway truck construction herein shown and described, it will be noted that the track frame 4 is resiliently supported by the wheel and axle assemblies 14—14. When the brake shoes 52—52 are moved into braking engagement with their respective rotors 26, it will be noted that the torque forces exerted by the rotors act to tilt the truck frame from a horizontal plane. To counteract the torque forces acting through the brake shoes 52 and brake frames 30 to tilt the truck frame 4, brake means including brake shoes 68 are provided to frictionally engage the treads of their respective wheels 22, the brake shoes 68 being disposed at opposite sides of the axes of their wheel and axle assemblies 14 from their associated brake shoes 52—52. It will be noted that the rotor brake shoes 52 and the tread brake shoes 68 are disposed to intersect a horizontal plane through the axes of the wheel and axle assemblies 14. During braking engagement of each wheel and axle assembly the brake shoes 52 are urged vertically in one direction while the brake shoes 68 are urged vertically in the opposite direction to thus equalize the torque forces tending to tilt the truck frame.

While this invention has been shown in but one form it is obvious to those skilled in this art that it is not so limited but is susceptible of various changes and modifications without departing from the spirit and scope of the claimed invention.

We claim:

In a brake arrangement for a four wheel railway car truck, a truck frame comprising side rails interconnected by spaced transoms and end rails, pedestal jaws depending from opposite ends of each side rail, journal boxes slidably engaged between their respective jaws for vertical movement relative to said frame, wheel and axle assemblies journaled at their ends in said journal boxes and resiliently supporting said frame, rotors mounted on opposite ends of each assembly, stator means mounted on said transoms to frictionally engage their respective rotors, power actuating means associated with each stator means, a tread brake arrangement for each assembly comprising spaced hangers pivotally suspended from one end rail, a brake beam supported at its ends on said hangers, brake head-shoe assemblies mounted on opposite ends of said beam to frictionally engage their respective wheels, spaced brake levers pivotally mounted intermediate their ends on said end rail with their lower ends operatively connected to said beam, intermediate levers pivotally mounted intermediate their ends on said end rail and extending transversely of the truck with their inboard ends connected to the upper ends of their respective brake levers, actuating levers extending transversely of the truck and having their inboard ends pivotally mounted on their respective side rails, pull rods connected to the outboard ends of their respective intermediate levers and to the medial portion of their respective actuating levers, a power cylinder means mounted on the outboard side of each side rail operatively connected to the outboard end of each actuating lever, said stator means and brake head-shoe assemblies being arranged on diametrically opposed sides of the axis of their respective wheel and axle assemblies and intersecting a horizontal plane through said axis whereby braking application of the tread brake arrangements move the wheel and axle assemblies horizontally toward each other to frictionally engage their respective journal boxes against their respective pedestal jaws to frictionally resist vertical movement of the frame responsive to frictional engagement of the stator means against their respective rotors, said power actuating means being operable independently of said power cylinder means.

References Cited in the file of this patent

UNITED STATES PATENTS

| | | |
|---|---|---|
| 601,206 | Hayes et al. | Mar. 22, 1898 |
| 2,352,222 | Pogue et al. | June 27, 1944 |
| 2,359,806 | Tack | Oct. 10, 1944 |
| 2,418,435 | Tack | Apr. 1, 1947 |
| 2,449,636 | Baselt | Sept. 21, 1948 |
| 2,673,622 | Coombes et al. | Mar. 30, 1954 |